April 14, 1970  J. A. WENGER ET AL  3,506,147
HOIST
Original Filed Oct. 23, 1965
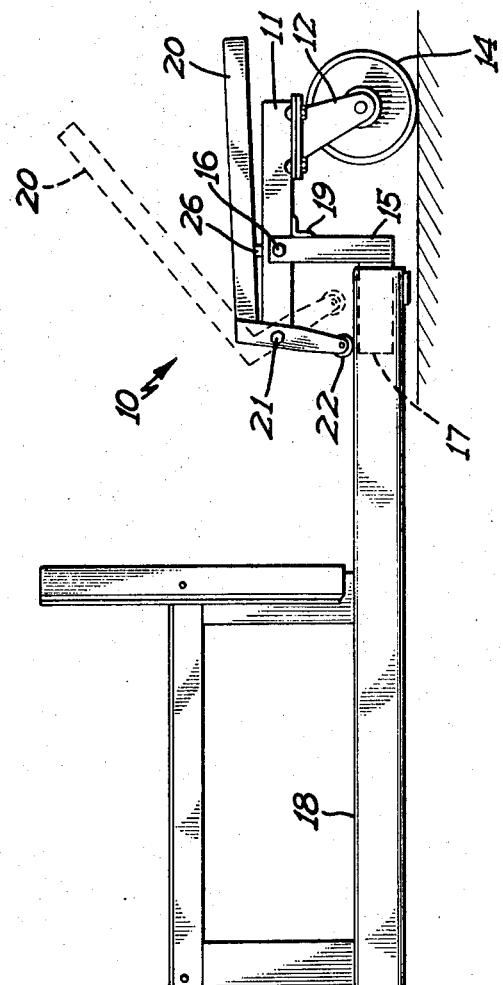
FIG 1
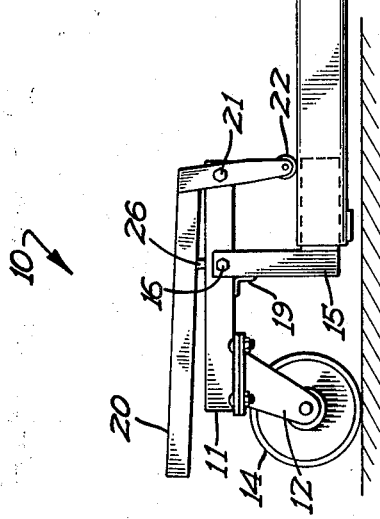
INVENTORS
JERRY A. WENGER,
HARVEY M. URCH
BY
L. A. MacEachron
ATTORNEY 3,506,147
HOIST
Jerry A. Wenger, Owatonna, and Harvey M. Urch, West Concord, Minn., assignors to Wenger Corporation, Owatonna, Minn., a corporation of Minnesota
Original application Oct. 23, 1965, Ser. No. 503,020. Divided and this application Jan. 2, 1969, Ser. No. 788,555
Int. Cl. B60p 3/00
U.S. Cl. 214—390                              6 Claims

ABSTRACT OF THE DISCLOSURE

A low elevation caster hoist having a wheel secured to one end of a horizontal beam that is pivotally secured near its center to a right angle arm and a bell crank toggle lever pivoted to the other end of the horizontal beam; the right angle arm and bell crank toggle lever cooperating to hoist an object and clamp the caster wheel to it.

BACKGROUND

There has long been a need for a low profile caster hoist that is readily detachable from the structure to which it is applied. Such a wheel has long been sought for various stage appurtenances such as scenery and sound reflecting structures. It should have a low elevation to permit nesting of items mounted on the wheels. For most desirable functioning and economical structure it must be readily removable but secure when in use. Desirably the unit should be removable to permit minimum obstructions when the castered device is in use and its removability also follows one set of wheels to be used with many units for best economy. All of these characteristics are found in the present invention.

SUMMARY

This application is a division of application of Jerry A. Wenger and Harvey M. Urch, Ser. No. 503,020, filed Oct. 23, 1965, for Sound Reflecting Structure.

Briefly the invention comprises a caster wheel that is secured at one end of a beam which is horizontal when the device is in use. Near the center of the beam a right angle arm is pivoted and provided with stop means so that in position, with the stop engaged, the beam and the lower portion of the right angle arm are nearly parallel. When the stop is not engaged, the lower portion of the right angle arm and the beam enclose an acute angle. In this last described condition, the lower portion of the right angle arm can slidably engage a member to be lifted.

Pivoted to the other end of the beam from the caster wheel is a bell crank toggle lever. The lever handle extends out over the caster wheel when the hoist is engaged. The other end of the bell crank lever carries anti-friction means such as a roller. When the right angle arm is engaged with a member to be lifted, and the bell crank lever is pulled down close to the beam, the beam is forced up to a parallel to the lower leg portion which raises the member to be lifted slightly. The roller of the bell crank lever moves past its pivot point when in use to act as a toggle lock.

In the drawing:
FIGURE 1 is a side elevation view of the invention with broken lines showing hidden parts and an adjusted position of the parts.

Referring to the drawings, caster hoist 10 comprises a horizontal beam 11 secured to a downwardly projected yoke 12. A wheel 14 is mounted on the yoke for rotation about a transverse axis. A right angle arm 15 projects downwardly from the mid-section of beam 11. Transverse pivot member 16, as a pin, pivotally connects the upper end of arm 15 to beam 11. The horizontal portion 17 of arm 15 has a rectangular cross-sectional shape slightly smaller than the cross-sectional shape of beam 18, of any member to be lifted, so that portion 17 can be telescoped into beam 18. Portion 17 projects away from wheel 14. The rear side of arm 15 to fix the horizontal position of portion 17. When arm 15 is coupled to support member 18 the forward portion of beam 11 is located above and in the vertical plane of beam 18. A bell crank lever 20 pivotally mounted by transverse pivot member 21 to the forward end of beam 11 is used to angularly raise beam 18 thereby lift support member 18 off the stage floor. Lever 20 has a short downwardly projected arm rotatably connected to a small roller 22 which rides on the top of member 18.

In use with support member 18 resting on the stage floor bell crank lever 20 is raised to the broken line position and the arm portion 17 is inserted into the end of member 18. Lever 20 is then forced to the horizontal full line position moving roller 22 along the top of member 18. As roller 22 moves along member 18 hoist beam 11 moves in an upward direction raising member 18 off the floor. Lever 20 is rotated until it engages a stop 26 on top of member 11 positioning roller 22 in an over center location relative to pivot member 21. This locks the caster hoist in the raised position and frictionally holds extension 17 in engagement with stop 19 and applies a rotational force to arm 15. This distorts extension 17 located in the end of member 18 thereby frictionally holding extension 17 in engagement with member 18. Support member 18 can be lowered by rotating lever 20 in an upward direction indicated in broken lines.

The preferred embodiment of the invention has been shown and described. It is understood that changes in material, changes in form and design can be made by those skilled in the art without departing from the spirit of the invention.

What is claimed is:
1. A hoist for raising a support having a member; said hoist comprising: a beam, wheel means rotatably secured to one end of the beam, an arm pivotally connected to the midportion of the beam and projected downwardly from the beam, said arm having an extension connectable to a portion of the member, a lever pivotally mounted on the other end of the beam, said lever having a portion extended downwardly, an anti-friction means secured to the remote end of said downwardly extending lever portion and engageable with the top of the member; whereby rotation of the lever in a downward direction angularly raises the beam lifting the member and supporting it on said wheel means and means for holding the lever in a downward direction.

2. The hoist defined in claim 1 in which said anti-friction means is a roller mounted on the downward member.

3. The hoist defined in claim 1 wherein said lever is a bell crank having a downwardly directed arm engageable with the member.

4. The hoist of claim 3 in which the anti-friction means is a roller secured to said bell crank.

5. The hoist defined in claim 1 wherein said wheel means is a castor wheel.

6. The hoist of claim 1 in which said means for holding said lever down is a toggle action.

References Cited

UNITED STATES PATENTS 2,375,720   5/1945   Wood _____ 214—390 XR
3,250,513   5/1966   Fenner et al. ____ 214—390 XR ALBERT J. MAKAY, Primary Examiner U.S. Cl. X.R.

254—131